(12) United States Patent
Freel

(10) Patent No.: US 7,905,990 B2
(45) Date of Patent: Mar. 15, 2011

(54) RAPID THERMAL CONVERSION OF BIOMASS

(75) Inventor: Barry Freel, Greely (CA)

(73) Assignee: Ensyn Renewables, Inc., Wilmington, DE (US)

( * ) Notice: Subject to any disclaimer, the term of this patent is extended or adjusted under 35 U.S.C. 154(b) by 472 days.

(21) Appl. No.: 11/943,329

(22) Filed: Nov. 20, 2007

(65) Prior Publication Data
US 2009/0139851 A1 Jun. 4, 2009

(51) Int. Cl.
*C10B 47/00* (2006.01)
*C10G 1/00* (2006.01)

(52) U.S. Cl. ............... 201/12; 201/21; 201/23; 201/25; 585/242; 208/131

(58) Field of Classification Search .......... 201/12, 201/21, 23, 25; 208/131; 48/76, 77, 111, 48/197 R; 422/143, 145, 147; 585/240, 585/242
See application file for complete search history.

(56) References Cited

U.S. PATENT DOCUMENTS

| | | | |
|---|---|---|---|
| 3,959,420 A | | 5/1976 | Geddes et al. |
| 4,880,473 A * | | 11/1989 | Scott et al. ................ 127/37 |
| 4,942,269 A * | | 7/1990 | Chum et al. ................ 585/240 |
| 4,968,325 A * | | 11/1990 | Black et al. ................ 48/76 |
| 5,792,340 A * | | 8/1998 | Freel et al. ................ 208/127 |
| 5,853,548 A * | | 12/1998 | Piskorz et al. ................ 201/7 |
| 5,879,650 A | | 3/1999 | Kaul et al. |
| 5,961,786 A | | 10/1999 | Freel et al. |
| 6,485,841 B1 * | | 11/2002 | Freel et al. ................ 428/498 |
| 6,555,649 B2 * | | 4/2003 | Giroux et al. ................ 530/200 |
| 7,004,999 B2 * | | 2/2006 | Johnson et al. ................ 95/271 |
| 7,572,362 B2 * | | 8/2009 | Freel et al. ................ 208/126 |

* cited by examiner

*Primary Examiner* — Nina Bhat
(74) *Attorney, Agent, or Firm* — Orrick, Herrington & Sutcliffe LLP

(57) ABSTRACT

A rapid thermal conversion process for efficiently converting wood, other biomass materials, and other carbonaceous feedstock (including hydrocarbons) into high yields of valuable liquid product, e.g., bio-oil, on a large scale production. Biomass material, e.g., wood, is feed to a conversion system where the biomass material is mixed with an upward stream of hot heat carriers, e.g., sand, that thermally convert the biomass into a hot vapor stream. The hot vapor stream is rapidly quenched with quench media in one or more condensing chambers located downstream of the conversion system. The rapid quenching condenses the vapor stream into liquid product, which is collected from the condensing chambers as a valuable liquid product. The liquid product may itself be used as the quench media.

14 Claims, 4 Drawing Sheets

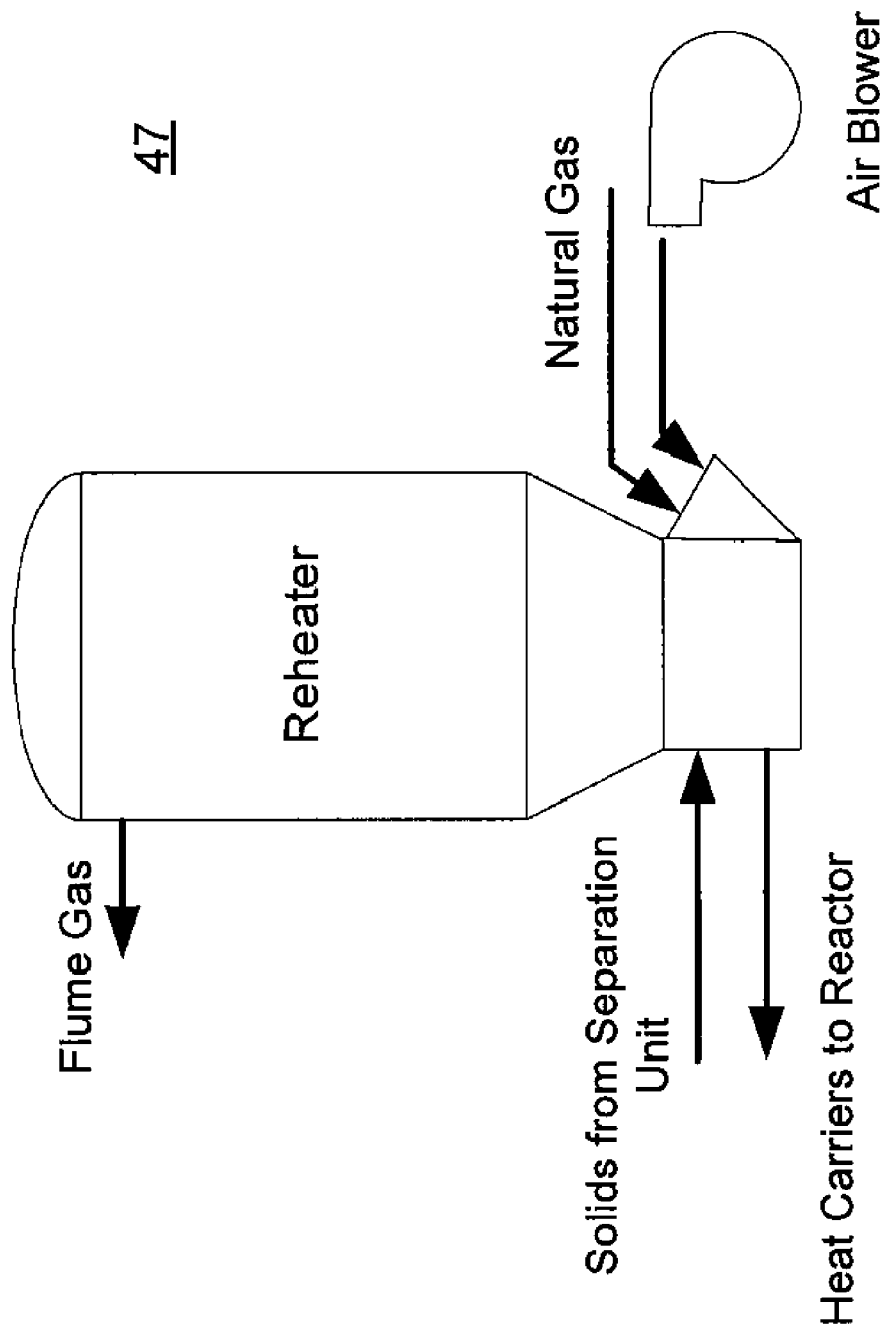

| Ex# | Collection Column | Bio-Oil Recovery Distribution (%) | Water Content (wt%) | Viscosity @70C (cST) | Density @ 25C (g/cm3) | NRP Content (wt%) | HA Content (wt/vol %) | Acid Content (weak) (dry wt%) | Higher Heating Value (MJ/kg) | Acetone/ THF Content (wt%) |
|---|---|---|---|---|---|---|---|---|---|---|
| 1 | Primary | 70.9 | 35 | 3.4 | 1.1814 | 13.9 | 6.25 | | 13.4 | |
| | Secondary | 29.1 | 24.6 | 17.9 | 1.2313 | 45.9 | 1.88 | | 18.2 | |
| 2 | Primary | 71.2 | 35.2 | 2.7 | 1.1824 | 16.5 | 6.33 | 10.9 | 13.6 | 0.1 |
| | Secondary | 28.8 | 19.3 | 28.8 | 1.2475 | 47.8 | 2.05 | 7.8 | 18.7 | 0.3 |
| 3 | Primary | 65.3 | 34.1 | 4.5 | 1.9998 | 18 | 5.89 | | 14.6 | |
| | Secondary | 34.7 | 30.1 | 10.6 | 1.2127 | 43.4 | 1.92 | | 16.4 | |
| 4 | Primary | 66.6 | 34.4 | 3.9 | 1.1904 | 15.7 | 6.15 | | 14.3 | |
| | Secondary | 33.4 | 23.7 | 16 | 1.2252 | 47.2 | 1.93 | | 16.7 | |
| 5 | Primary | 80.1 | 29.6 | 3.8 | 1.193 | 15.8 | 6.03 | 10.4 | 14.5 | 1.1 |
| | Secondary | 19.9 | 19.6 | 23.8 | 1.2437 | 42.3 | 1.78 | 6.4 | 18.3 | 0.2 |
| 6 | Primary | 64.5 | 24.5 | 5.8 | 1.2133 | 19.5 | 6.86 | | 15.5 | |
| | Secondary | 35.5 | 27.9 | 11.5 | 1.2156 | 43.7 | 1.64 | | 16.6 | |
| 7 | Primary | 67.3 | 30.1 | 4.6 | 1.203 | 17.6 | 6.67 | | 15.2 | |
| | Secondary | 32.7 | 26.7 | 12.3 | 1.2219 | 52.5 | 1.76 | | 16.7 | |
| 8 | Primary | 65.1 | 33.7 | 3.6 | 1.1887 | 16.2 | 6.3 | 10.2 | 14.3 | 1.2 |
| | Secondary | 34.9 | 20.2 | 27.9 | 1.2504 | 39.6 | 1.7 | 8 | 19 | 0.3 |
| 9 | Primary | 62.8 | 27.9 | 5.3 | 1.2065 | 20.8 | 6.4 | | 14.5 | |
| | Secondary | 37.2 | 28.5 | 10 | 1.208 | 44.1 | 1.74 | | 15.8 | |

FIG. 4

RAPID THERMAL CONVERSION OF BIOMASS

FIELD OF THE INVENTION

The present invent relates to the rapid thermal conversion of wood and/or other biomass into high yields of valuable liquid product, e.g., bio-oil.

BACKGROUND OF THE INVENTION

Biomass has been the primary source of energy over most of human history. During the 1800's and 1900's the proportion of the world's energy sourced from biomass dropped sharply, as the economical development of fossil fuels occurred, and markets for coal and petroleum products took over. Nevertheless, some 15% of the world's energy continues to be sourced from biomass, and in the developing world, the contribution of biomass to the energy supply is close to 38%.

Solid biomass, typically wood and wood residues, is converted to useful products, e.g., fuels or chemicals, by the application of heat. The most common example of thermal conversion is combustion, where air is added and the entire biomass feed material is burned to give hot combustion gases for the production of heat and steam. A second example is gasification, where a small portion of the biomass feedstock is combusted with air in order to convert the rest of the biomass into a combustible fuel gas. The combustible gas, known as producer gas, behaves like natural gas but typically has between 10 and 30% of the energy content of natural gas. A final example of thermal conversion is pyrolysis where the solid biomass is converted to liquid and char, along with a gaseous by-product, essentially in the absence of air.

In a generic sense, pyrolysis is the conversion of biomass to a liquid and/or char by the action of heat, normally without using direct combustion in a conversion unit. A small quantity of combustible gas is also a typical by-product. Historically, pyrolysis was a relatively slow process where the resulting liquid product was a viscous tar and a "pyrolygneous" liquor. Conventional slow pyrolysis has typically taken place at temperatures below 400° C. and at processing times ranging from several seconds to minutes. The processing times can be measured in hours for some slow pyrolysis processes used for charcoal production.

A more modern form of pyrolysis, termed fast pyrolysis, was discovered in the late 1970'S when researchers noted that an extremely high yield of a light pourable liquid was possible from biomass. In fact, liquid yields approaching 80% of the weight of the input woody biomass material were possible if the pyrolysis temperatures were moderately raised and the conversion was allowed to take place over a very short time period, typically less than 5 seconds.

The homogeneous liquid product from fast pyrolysis, which has the appearance of espresso coffee, has since become known as bio-oil. Bio-oil is suitable as a fuel for clean, controlled combustion in boilers, and for use in diesel and stationary turbines. This is in stark contrast to slow pyrolysis, which produces a thick, low quality, two-phase tar-aqueous mixture in very low yields.

In practice, the fast pyrolysis of solid biomass causes the major part of its solid organic material to be instantaneously transformed into a vapor phase. This vapor phase contains both non-condensable gases (including methane, hydrogen, carbon monoxide, carbon dioxide and olefins) and condensable vapors. It is the condensable vapors that constitute the final liquid bio-oil product and the yield and value of this bio-oil product is a strong function of the method and efficiency of the downstream capture and recovery system. The condensable vapors produced during fast pyrolysis continue to react in the vapor phase, and therefore must be quickly cooled or "quenched" in the downstream process before they can deteriorate into lower value liquid and gaseous products. As fast pyrolysis equipment is scaled up in commercial operations, particular attention must be given to the strategy and means of rapid cooling, quenching and recovery of the liquid bio-oil product.

SUMMARY

The present invention provides improved rapid thermal conversion processes of biomass by effecting the efficient recovery of high yields of valuable liquid product (e.g., bio-oil) from the vapor phase, on a large scale production.

In an embodiment, biomass material, e.g., wood, is feed to a conversion system where the biomass material is mixed with an upward stream of hot heat carriers, e.g., sand, in a substantially oxygen-free environment in a thermal conversion temperature range between 350 and 600° C. The hot heat carriers contact the biomass material thermally converting the biomass into a hot vapor stream, which is cooled, condensed, and recovered downstream as a liquid product. In a preferred embodiment, the thermal conversion occurs at a temperature of around 500° C. with a resident time of less than 5 seconds, and more preferably less than 2 seconds.

The hot vapor stream is directed to a condensing chamber, or a multiple of condensing chambers, where the hot vapor stream is rapidly cooled from a conversion temperature of approximately 350° C. to 600° C. to a temperature of less than 100° C. in less than 1 s, more preferably to a temperature of less than 50° C. in less than 100 ms, and most preferably to a temperature of less than 50° C. in less than 20 ms. In a preferred embodiment, the upward flowing vapor stream is cooled by rapidly quenching the vapor stream with a downward flow of quench media. This rapid and intimate cooling or quenching by a downward flow of quench media condenses the vapor stream into liquid product. In a preferred embodiment, a portion of the condensed liquid product is drawn out of the condensing chamber, or chambers, cooled and circulated back to the condensing chamber, or chambers, to provide the quench media. The liquid product used for the quench media may be cooled to a temperature of between 30° C. and 50° C. before being circulated back to the condensing chamber. Preferably, the quench media is poured down at a rate of at least 10 gpm/sq. ft (gallon per minute/sq. ft) of the cross-sectional area of the condensing camber, and more preferably at a rate of at least 50 to 100 gpm/sq. ft. The liquid product in the chamber is collected as a valuable liquid product, e.g., bio-oil, that can be used, e.g., for fuel and/or other commercial uses. The processes of the invention are able to produce high yields of valuable liquid product, e.g., approximately 75% or more of the input biomass material.

In an embodiment, a second condensing chamber located downstream of the first condensing chamber is used to condense vapor that evades condensation in the first condensing chamber to increase the yield of liquid product. The second condensing chamber may use the same or different quench media as the first condensing chamber.

In an embodiment, a demister and filter are associated with the first and/or second condensing chambers to remove fine particles from the gas stream exiting the condensing cambers and collect additional liquid product from the gas stream.

Preferably, the conversion and collection process is carried at or near atmospheric pressure, which makes biomass feeding, conversion, and the collection of the liquid product easier and safer. This also allows the biomass to be continuously feed to the conversion system at a high rate facilitating large scale industrial production of the liquid product.

The above and other advantages of embodiments of this invention will be apparent from the following more detailed description when taken in conjunction with the accompanying drawings.

BRIEF DESCRIPTION OF THE DRAWINGS

FIG. 3 shows a reheater for reheating heat carriers according to an embodiment of the present invention.

FIG. 4 is a table showing results for exemplary thermal conversion processes according to embodiments of the present invention.

DETAILED DESCRIPTION

Figure 1:
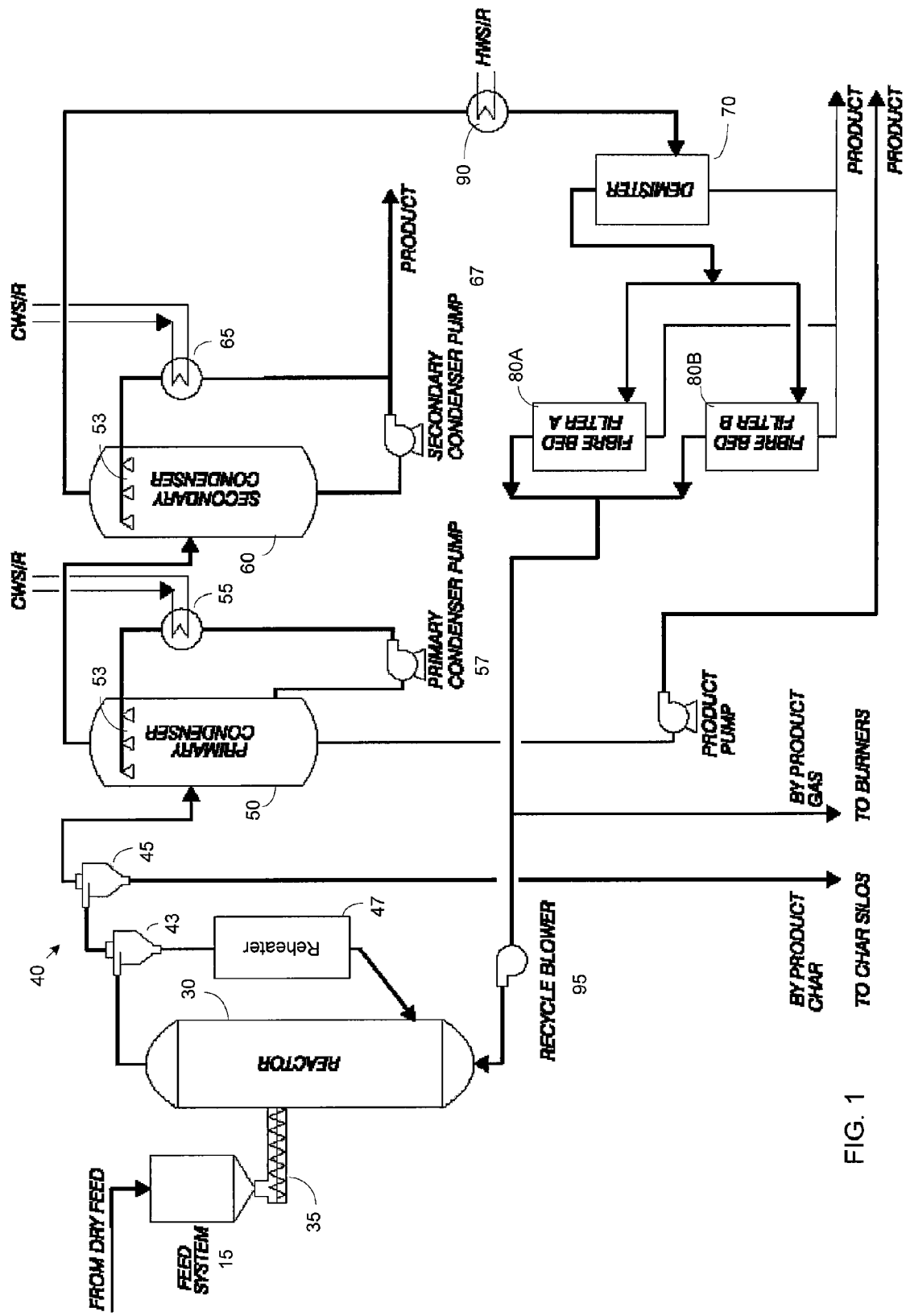
FIG. 1 shows a diagram of a thermal conversion and liquid product collection system according to an exemplary embodiment of the present invention.

FIG. 1 shows a rapid thermal conversion system 10 for converting biomass, e.g., wood, into high yields of liquid product according to an exemplary embodiment of the present invention.

Feed System

Figure 2:
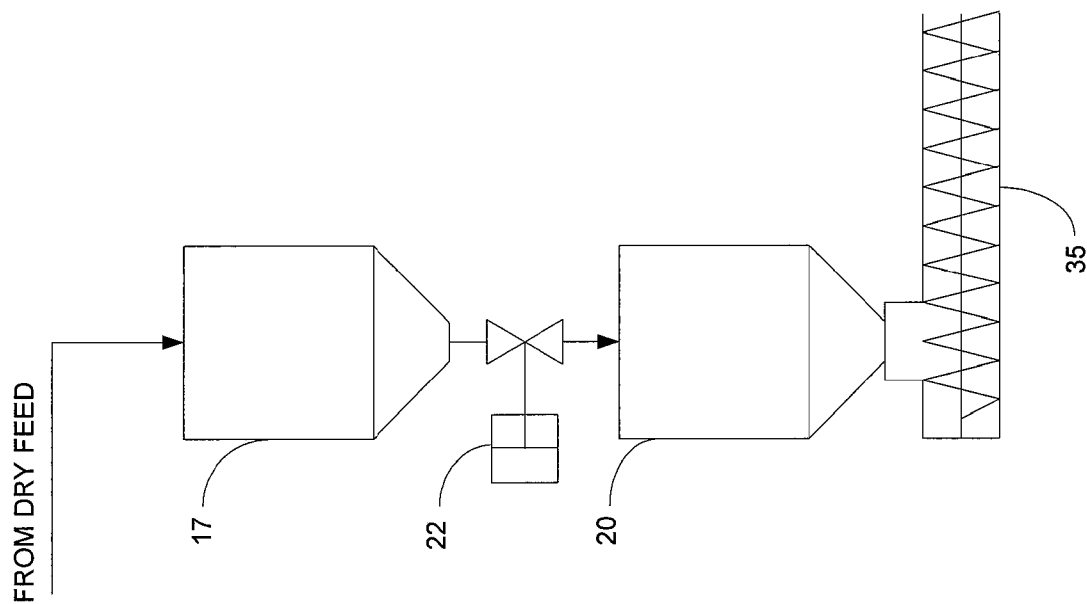
FIG. 2 shows a feed system for feeding biomass feedstock to the thermal conversion system according to an exemplary embodiment of the present invention.

The feed system 15 is used to provide a regulated flow of solid biomass feedstock to the conversion system 10. Preferably, the biomass feedstock is a dry wood feedstock, which may be in the form of sawdust, but liquid and vapor-phase (gas-phase) biomass materials can be effectively processed in the rapid thermal conversion system using an alternative liquid or vapor-phase feed system. Biomass feedstock materials that may be used include, but are not limited to, hardwood, softwood, bark, agricultural and silvicultural residues, and other biomass carbonaceous feedstocks. Embodiments of the invention can also be applied to the conversion of other carbonaceous feedstocks including, but not limited to, plastics, polymers, hydrocarbons, petroleum, coal, and refinery feedstocks. Since the conversion system operates at slightly above atmospheric pressure (i.e., sufficient pressure to overcome the back pressure of the down stream equipment), the feed system 15 should provide material to the conversion system 10 under slight pressure (1.2 atmospheres) while at the same time accepting feedstock material from, e.g., a wood storage silos, which is at atmospheric pressure. To achieve a continuous supply of feedstock in this manner a lock-hopper system is utilized, which is shown in greater detail in FIG. 2.

The feed system 10 comprises a feedstock surge bin 17, a feed bin 20, and a transfer valve 22, e.g., knife gate valve, between the surge bin 17 and feed bin 20. The valve 22 provides isolation of the surge bin 17 from the feed bin 20, and preferably comprises an elastomer seat to ensure a gas tight seal. The valve 22 allows filling of the surge bin 17 with feedstock under atmospheric conditions while maintaining a seal in the feed bin 20 so that the feed bin 20 can operate at above atmospheric pressure.

The feedstock surge bin 17 is preferably a cylindrical vessel constructed of carbon steel and has a capacity that is sufficient to hold enough feedstock, e.g., for approximately 30 minutes of feedstock transfer before refilling. The surge bin 17 is equipped with a bottom-out feed system and internal bridge-breaking device used to dislodge held-up biomass material. Examples of bridge breaking devices include a sweep-arm with or without finger projections, vibration devices, swing chains, and the like. The rate of feedstock discharge from the surge bin 17 may be fixed and a full transfer cycle completed within approximately 10 minutes. Three level sensors (high level switch high, low level switch low, and low-low level switch) may be used to activate feedstock transfer. In addition, continuous monitoring of the feedstock material level in the surge bin 17 may be achieved with a level transmitter. When the level of material in the surge bin 17 drops to activate the low level switch, feedstock material will automatically be transferred from the feedstock storage system (not shown) to the surge bin 17. The high level switch is used to indicate when the surge bin is full and the material transfer from the feedstock storage system is terminated. The low-low switch is a back-up switch to indicate that the bin is empty when the low level switch is not triggered. This may occur, e.g., when material holds up on the low level switch giving a false reading. The valve 22 is closed when the surge bin is being filled.

When the level in the feed bin 20 reaches the lower level switch, feedstock material is automatically transferred from the surge bin 17 to the feed bin 20. Prior to opening the valve 22, the pressure of the surge bin 17 is equalized with the feed bin 20. The feedstock material can be transferred from the surge bin 17 to the feed bin 20 by direct transfer when the surge bin 17 is located directly above the feed bin 20 and the valve 22 is opened. Alternatively, if the bins are off-set, then an auger or screw feeder system (not shown) can be used to transfer material from the surge bin 17 to the feed bin 20. The auger or screw can be horizontal or inclined depending on the relative orientation of the two bins. The feed bin 17 is preferably constructed of carbon steel and is equipped with a volumetric bottom-out feeder. The volumetric feeder provides a metered flow of material to a constant speed conversion inlet screw conveyor 35, which transfers the material to the conversion system 10. The operator can adjust the desired flow of material by adjusting the speed of the screw conveyor 35. To provide feedstock conditioning, an internal bridge-breaking system is incorporated.

The constant speed screw conveyor 35 is constructed of stainless steel and is provided with high temperature seals and bearings. The conveyor 35 may operate at a constant speed and is capable of discharging material into the conversion system 10 at a higher rate than is being provided by the volumetric feeder. This ensures a homogeneous, dispersed flow of material. For safety, the outlet of the screw 35 is fitted with an emergency isolation knife valve and water quench system.

Thermal Conversion System

The thermal conversion system 10 includes a reactor 30 that mixes the feedstock with an upward flowing stream of hot heat carriers, e.g., sand, in a mixing zone. The reactor is essentially oxygen free. The feedstock enters the reactor 30 just below the mixing zone and is contacted by the upward flowing stream of hot heat carriers (sand) and their transport fluid (recycle gas). The result is thorough and rapid mixing and conductive heat transfer (including ablation) from the heat carriers to the feedstock. The hot heat carriers instantly flash the feedstock into a hot vapor, which is cooled, condensed, and recovered downstream as a liquid product.

Thermal conversion of the feedstock is initiated in the mixing zone under moderate temperatures, e.g., approximately 500° C. (approximately 930° F.) and continues through to the separation system 40 located downstream of the reactor 30. The resident time in the reactor is preferably less than 5 seconds, and more preferably less than 2 seconds.

The solid heat carriers along with by-product char are removed from the product vapor stream in the separation system 40. Preferably, the separation system is fitted with high-abrasion resistant liner to minimize the likelihood of premature failure. The product vapor stream passing through the separation system 40 is directed to the downstream liquid product recovery system 50.

In the embodiment shown in FIG. 1, the separation system 40 comprises two cyclonic separators 43 and 45. The first cyclonic separator 43 separates the solid heat carriers and by-product char from the product stream. The solids that have been removed in the first separator 43 are directed to a reheater unit 47. The second separator 45 removes char that is not removed in the first separator 43. The reheater unit 47 is shown in greater detail in FIG. 3.

In the reheater unit 47, the by-product char is converted by the addition of air to heat and combustion gases. Typically, there is more than sufficient heat generated by the combustion of by-product char and gas to satisfy the heat requirements of the thermal conversion process (external fuels, such as natural gas, are rarely used and typically for system start-up alone). The excess heat from the reheater can be productively used for other purposes, including biomass drying, steam generation, space heating, power generation, etc. The heat generated in the reheater elevates the temperature of the solid heat carriers, which can then be transferred to the feedstock material in the reactor 30 to achieve the necessary reaction temperatures.

Liquid Product Collection System

The hot vapor product stream from the solids separation system 40 is directed via an insulated duct to a primary collection column or condensing chamber 50. Preferably, the hot vapor stream is brought from a conversion temperature of approximately 350° C. to 600° C., to less than 100° C. in less than 1s. More preferably, the hot vapor stream is reduced to less than 50° C. in less than 0.1 s (100 ms), and most preferably to a temperature of less than 50° C. in less than 20 ms. The primary collection column 50 is equipped with a liquid distributor 53 located in the upper portion of the column 50. Cooled liquid product or other appropriate quench media (e.g., water, diesel, other petroleum based liquid, polysorbate, etc) is circulated through the distributor 53 and allowed to "rain" down on the incoming vapor stream. Various types of distributor systems can be employed. Examples include, but are not limited to, vane, pipe, chimney, finger distributor, spray head, nozzle design, trays, packing, etc. Preferably, at least 10 gpm/sq. ft (gallons per minute/sq. ft) of column cross-sectional diameter of quench liquid is circulated through the collection column. More preferably, at least 50 to 100 gpm/sq. ft of column cross-sectional diameter of quench liquid is circulated through the collection column. The dense stream of liquid raining down the column not only serves to immediately cool and quench the incoming vapor but also provides nucleation sites for the collection of the liquid product. Typically, the hot vapor enters the collection column 50 just above the normal operating level of the collected liquid in the column 50. The vapor not collected in the primary collection column 50 along with the non-condensable gas exit the column 50 through a top exit port. This mode of operation is counter-current. In another mode of operation in which it is desired to minimize the length of the hot vapor piping the hot vapor enters through the upper portion of the column 50 and the vapor not collected in the column 50 along with the non-condensable gas exit through a port situated in the lower portion of the column (just above the normal liquid level). This mode of operation is co-current. The column 50 may be equipped with a demister in the gas exit section of the column to reduce the carryover of liquid droplets into the second collection column 60.

Condensed liquid that has associated with the down flowing atomized quench stream accumulates in the lower portion of the column 50. In addition, heavy condensed droplets fall to the lower portion of the column 50 due to gravitational sedimentation. Level transmitters in the column 50 are used to monitor and maintain the desired liquid levels. In an embodiment, a portion of the liquid product is drawn out from the column 50 and pumped by a condenser pump 57 through a heat exchanger 55 to cool the liquid product to, e.g., 30 to 50° C. The cooling medium for the heat exchanger 55 can be water. Other cooling means may be employed including a glycol system, an air cooler, or the like. The cooled liquid product is circulated back to the column distribution system 53 to provide the quench media for the incoming vapor stream.

The liquid product in the collection column is pumped out to product storage tanks (not shown) to maintain the desired liquid level. The collected liquid product provides a valuable liquid product, bio-oil, that can be used, e.g., for fuel and/or other commercial uses.

The vapor is rapidly quenched because the vapor and liquid product are thermally labile (chemically react at higher temperatures). By using a high liquid recirculation/quench rate, the incoming vapor is rapidly quenched, which avoids undesirable chemical reactions such as polymerization that occur at higher temperatures. Further, the high recirculation rate of the liquid product used for the quench media prevents the quench media from reaching undesirably high temperatures.

The vapor not collected in the primary collection column 50 or vessel is directed to a secondary collection column 60 (secondary condensing column). Again as was the case for the primary condensing column 50 the collected product liquid is used as a quench media via an overhead distribution system 53. Preferably, at least 10 gpm/sq. ft of column cross-sectional diameter of liquid is circulated through the column 60. More preferably, at least 50 to 100 gpm/sq. ft of column cross-sectional diameter of quench liquid is circulated through the column 60. The column 60 may be equipped with a demister in the gas exit section of the column 60 to reduce the carryover of liquid droplets, mist or aerosols into the downstream demister or filtering systems. The cross-sectional diameter of this column 60 may be the same as the primary collection column 50. However, it is typically smaller in diameter since greater superficial gas velocities will facilitate the removal of the fine droplets or aerosols in the demister section of the column 60.

Mist, aerosols and non-condensable gas that exit the secondary collection column 60 are directed to a separate demister system 70. If the secondary collection column 60 is equipped with an internal demister unit, then the downstream separate demister may not be required. The demister system 70 preferably removes mist droplets that are greater than 3 microns. These droplets tend to be captured in the demister by inertial impaction. The particles, which are traveling in the gas stream, are unable to abruptly change direction along with the gas as the flow goes through the demisting system 70 due to their weight. As a result, they impact the fibers of the demister and are subsequently captured. Mist particles that come in contact with the demister fibers adhere by weak Van Der Waals forces. The accumulating impacting mist droplets tend to join together to form larger single droplets that finally fall to the lower portion of the demister vessel due to gravitational sedimentation.

The demister system 70 may comprise a series of mist eliminator units. The first unit is a vane mist eliminator which can remove about 99% of the mist as low as 10 microns. Next is a stainless steel wire mesh pad having a density of about 5 lbs/ft$^3$ and a wire diameter of 0.011 inches (surface area of 45 ft$^2$/ft$^3$, and 99.0% voids). Other materials may be used besides steel including glass, alloy 20, Teflon, polypropylene, or the like. This is followed by a 9 lb/ft$^3$ stainless steel wire mesh pad, again 0.011 inch diameter (surface area of 85 ft$^2$/ft$^3$, and 98.0% voids). The final mist eliminator unit is a co-knit style comprising a metal wire construction with fiberglass. The pad is 9 lb/ft$^3$ with a wire diameter of 0.00036 inches (surface area of 3725 ft$^2$/ft$^3$, and 99.0% voids).

Fine aerosols (i.e., less than approximately 3 microns), condensed particles of greater than 3 microns that evaded the demister system 70, and non-condensable gas from either the secondary condensing column 60 or the demister system 70 pass to a final filtering system 80. The filter system 80 may comprise two fiber beds 80A and 80B set up in parallel, as shown in FIG. 1. Again, as was the case with the demister system 70, particles larger than about 3 microns are captured by inertial impaction. Condensed particles between 1 and 3 microns tend to be captured through interception in which the particles follow the non-condensable gas stream line that comes within about one particle radius of the surface of a fiber. Particles of less than 1 micron are captured through diffusion or Brownian movement in which the particles have a tendency to attach themselves to the fibers of the filter 80 due to their random motion. Again, captured particles tend to join together to form larger liquid droplets. However, the pressure drop across the filter 80 may exceed predetermined limits before a sufficient quantity of material has drained to the lower section of the filter vessel. In addition, re-entrainment of collected material can occur as the localized loading of liquid increases the effective open cross-sectional area of the filter decreases thereby increasing the flow of gas through the remaining open areas. This increase flow of gas leads to increased velocities that can lead to higher than desired pressure drops and possibly re-entrainment, and loss of captured liquid. Therefore, the filtering system 80 can consist of more than one filter unit which can be set up in parallel or in series as required. Typically two filter units 80A and 80B are employed in parallel in which one filter unit is on-line at any one time. A filter unit may remain on-line for a period of about 8 to 24 hours (typically 12 hours). When the filter unit is switched off-line it is allowed to drain. The pressure drop across the filter unit can also dictate the period of time that the unit is allowed to remain on-line. Pressure drops that exceed predetermined limits (typically 100 inches of water column) can lead to failures of the filter elements (i.e., tear holes can develop in the fabric) of the filter unit.

Since the collected mists and aerosol liquid can tend to be relatively viscous at ambient conditions a reheat exchanger 90 can be employed between the secondary condenser column 60 and the demister 70 and fiber bed filters 80A and 80B. Alternatively, if the demister is incorporated in the secondary condenser column 60, the reheat exchanger will be installed upstream of the fiber bed filters 80A and 80B only. This reheat exchanger 90 is used to slightly elevate the temperature of the vapor stream (up to about 60-65° C.) and enable a sufficient viscosity reduction of the captured liquids in the downstream systems 70 and 80 to allow adequate drainage.

The gas filtered through the filter system 80 is recycled back to the reactor 30 by reactor blower 95. The recycled gas provides the transport fluid for the upward flow of hot carriers in the mixing zone of the reactor 30.

Results for exemplary thermal conversion processes according to embodiments of the present invention will now be discussed. In these examples, the primary and secondary collection columns each had a diameter of approximately 4 feet. The feed rate of biomass material into the conversion system varied between approximately 2650 to 3400 lb/hr. The temperature of the incoming vapor was approximately 500° C. with a flow rate of approximately 1100 standard cubic feet per minute (scfm). In these examples, a portion of the liquid product in each collection column was cooled and circulated back to the collection column to provide the quench media. Table 1 below shows quench temperatures and recirculation rates for nine exemplary process parameters. The quench temperature is the temperature of the cooled liquid product prior to injection back to the collection column, and the recirculation rate is the flow rate of the liquid product at the top of the collection column.

TABLE 1

Quench Temperatures and Recirculation Rates

| EXAMPLE | BIO-OIL QUENCH TEMPERATURE (° C.) | BIO-OIL RECIRCULATION RATE (GPM) |
| --- | --- | --- |
| 1 | 36 | 750 |
| 2 | 30 | 760 |
| 3 | 41 | 715 |
| 4 | 36 | 670 |
| 5 | 30 | 675 |
| 6 | 41 | 675 |
| 7 | 36 | 625 |
| 8 | 30 | 625 |
| 9 | 41 | 625 |

Results for the nine examples are shows in Table 2 in FIG. 4. Each exemplary process was conducted over a period of approximately 12 hours. Table 2 shows the percentage distribution of bio-oil collected in the primary and secondary collection columns or condensers, in which the collection in the secondary collection column included bio-oil collection from the demister and fiber bed filters. Table 2 also shows properties of the bio-oil collected from the primary and secondary collection columns.

Although the present invention has been described in terms of the presently preferred embodiments, it is to be understood that the disclosure is not to be interpreted as limiting. Various alterations and modifications will no doubt become apparent to those skilled in the art after having read this disclosure. Accordingly, it is intended that the appended claims be interpreted as covering all alterations and modifications as fall within the spirit and scope of the invention.

What is claimed is:

1. A method for converting biomass or non-biomass feedstock into liquid product comprising:
    mixing feedstock with solid heat carriers in a reactor to thermally convert the feedstock into a vapor stream at a conversion temperature of between 350 and 600° C.;
    separating the solid heat carriers from the vapor stream;
    rapidly quenching the vapor stream with a quench media to a temperature of less than 100° C. in less than 1 second in a condensing chamber to condense the vapor stream into liquid product; and
    collecting liquid product from the condensing chamber.

2. The method of claim 1, wherein the feedstock comprises biomass feedstock.

3. The method of claim 2, wherein the biomass feedstock comprises essentially wood.

4. The method of claim 1, wherein the feedstock comprises non-biomass carbonaceous feedstock.

5. The method of claim 4, wherein the non-biomass carbonaceous feedstock comprises plastics, polymers, hydrocarbons, petroleum, coal, or refinery feedstock.

6. The method of claim 1, further comprising:
pumping liquid product out of the condensing chamber;
cooling the pumped liquid product to a temperature of approximately 30 to 50° C.; and
circulating the cooled liquid product back to the condensing chamber to provide the quench media.

7. The method of claim 6, wherein the quench media is poured down on the vapor stream at a flow rate of at least 10 gallons per minute (gpm) per square feet of a cross-sectional area of the condensing chamber.

8. The method of claim 7, wherein the quench media is poured down on the vapor stream at a flow rate of at least 50 gpm per square feet of the cross-sectional area of the condensing chamber.

9. The method of claim 1, wherein the vapor stream is quenched to a temperature of less than 50° C. in less than 0.1 seconds.

10. The method of claim 9, wherein the vapor stream is quenched to a temperature of less than 50° C. in less than 0.02 seconds.

11. The method of claim 1, wherein the solid heat carriers essentially comprise sand.

12. The method of claim 1, wherein the thermal conversion produces by-product char, further comprising:
introducing the by-product char and the heat carries separated from the vapor stream into a reheater unit;
combusting the by-product char in the reheater unit to reheat the heat carriers; and
introducing the reheated heat carriers back to the reactor to thermally convert incoming feedstock.

13. The method of claim 1, further comprising:
directing a portion of the vapor stream that evades condensation in the condensing chamber through a demister and filter system;
collecting additional liquid product in the demister and filter system; and
directing gas outputted from the demister and filter system to the reactor to provide a flow of the heat carriers in the reactor.

14. The method of claim 1, further comprising:
directing a portion of the vapor stream that evades condensation in the condensing chamber to a secondary condensing chamber;
rapidly quenching the directed vapor stream with quench media in the secondary condensing chamber; and
collecting additional liquid product from the secondary condenser chamber.

* * * * *